United States Patent
Bronicki et al.

(12)

(10) Patent No.: US 6,321,539 B1
(45) Date of Patent: Nov. 27, 2001

(54) RETROFIT EQUIPMENT FOR REDUCING THE CONSUMPTION OF FOSSIL FUEL BY A POWER PLANT USING SOLAR INSOLATION

(75) Inventors: Lucien Y. Bronicki, Yavne; Uriyel Fisher, Haifa, both of (IL)

(73) Assignee: Ormat Industries Ltd., Yavne (IL)

( * ) Notice: Subject to any disclaimer, the term of this patent is extended or adjusted under 35 U.S.C. 154(b) by 0 days.

(21) Appl. No.: 09/387,504

(22) Filed: Sep. 1, 1999

(51) Int. Cl.$^7$ .................................................. B60K 16/00
(52) U.S. Cl. .............................. 60/641.8; 60/651; 60/671
(58) Field of Search ................................... 60/641.8, 651, 60/671

(56) References Cited

U.S. PATENT DOCUMENTS

| | | | |
|---|---|---|---|
| 4,189,922 | * 2/1980 | Bellofatto | 60/641.8 |
| 5,038,567 | * 8/1991 | Mortiz | 60/671 X |
| 5,806,317 | * 9/1998 | Kohler et al. | 60/641.8 X |
| 5,816,048 | * 10/1998 | Bronicki et al. | 60/651 X |

OTHER PUBLICATIONS

Doron, P. ed., "From Basic Research to Industry," Sun Day Symposium, (title page, table of contents and forward) May 1996.

Sagie, D., "An Overview of Rotem's Activities in the Development of A Volumetric Solar Termal Receiver," presented at Sun Day Symposium, (abstract and complete entry) May 1996.

Fisher, U., "Heat to Power Conversion in the 'Beam Down' Solar System," presented at Sun Day Symposium, (abstract and complete entry) May 1996.

Epstein, M. et al., "Results of a Feasibility Study on the Possible Use of the Solar Tower Technology at the Dead Sea Works," presented at Sun Day Symposium, ( ) (abstract and complete entry) May 1996.

Epstein, M., "Solar Thermochemistry Activities at the Weizmann Institute of Science (WIS)," presented at Sun Day Symposium, (abstract and complete entry) May 1996.

* cited by examiner

Primary Examiner—Hoang Nguyen
(74) Attorney, Agent, or Firm—Nath & Associates PLLC; Gary M. Nath; Jerald L. Meyer (57) ABSTRACT

Retrofit equipment includes an auxiliary gas turbine unit including an auxiliary compressor for compressing ambient air to produce compressed air, a solar collector that receives the compressed air for heating the same too produce heated compressed air, and an auxiliary turbine coupled to the auxiliary compressor and to an auxiliary generator for expanding the heated compressed air and driving the auxiliary compressor and auxiliary generator thereby producing power and hot exhaust gases. A boiler has heat exchanger coils containing water and receives hot exhaust gases for vaporizing water in the coils and producing steam. A condensor condenses the expanded steam to condensate, and a pump returns the condensate to the boiler.

24 Claims, 7 Drawing Sheets

RETROFIT EQUIPMENT FOR REDUCING THE CONSUMPTION OF FOSSIL FUEL BY A POWER PLANT USING SOLAR INSOLATION

DESCRIPTION

1. Technical Field

This invention relates to retrofit equipment for reducing the consumption of fossil fuel by a power plant using solar insolation.

2. Background of the Invention

Because of the problem of global warming, the finite supply of fossil fuels, and the stigma associated with the use of nuclear energy, interest exists in developing equipment and processes that rely on renewable energy sources, and in particular, solar energy, for power generation. Probably many decades will pass, however, before the switch from fossil fuels is complete.

It is therefore an object of the present invention to reduce the costs as well as the time involved in switching to solar based power plants by retrofitting existing fossil fueled power plants with equipment based on solar technology. This will permit the gradual replacement of existing fossil fueled power plants with minimal risk and reduced capital expenses.

SUMMARY OF THE INVENTION

Retrofit equipment according to the present invention includes an auxiliary gas turbine unit including an auxiliary compressor for compressing ambient air to produce compressed air, a solar collector that receives the compressed air for heating the same to produce heated compressed air during solar insolation, and an auxiliary turbine coupled to the auxiliary compressor and to an auxiliary generator for expanding the heated compressed air and driving the auxiliary compressor and auxiliary generator thereby producing power and hot exhaust gases. When solar insolation is available, a flow control selectively supplies the hot exhaust gases from the retrofit equipment to a boiler which is part of a conventional fossil fueled power plant. The boiler has heat exchanger coils containing water and receives hot exhaust gases for vaporizing water in the coils and producing steam which is supplied to a steam turbine coupled to a generator for expanding steam produced by the boiler, and driving the generator and producing power and expanded steam. A condenser condenses the expanded steam to condensate, and a pump returns the condensate to the boiler. When solar insolation is not available, the flow control supplies the boiler with hot gases from a primary gas turbine unit which includes a primary compressor that compresses ambient air to produce compressed air, and a combustor that receives the compressed air for burning fossil fuel and heating the compressed air to produce heated compressed air that is supplied to the primary turbine.

At night and during cloudy days or other periods of inclement weather, the primary gas turbine unit is operational, and the secondary gas turbine is quiescent. In such case, the power plant operates by burning fossil fuel. During the day, the secondary gas turbine unit operates and the primary gas turbine unit is quiescent and no fossil fuel is burned, the flow control directing exhaust gases from the secondary gas turbine unit to the boiler.

Preferably, the boiler includes a conduit having an upstream end for receiving the hot exhaust gases which flow through the conduit to a downstream end through which the gases are vented to the atmosphere. The boiler also may include a combustion chamber for burning fuel and producing hot flue gases which interact with heat exchanger coils in the conduit for heating the steam condensate and producing steam that is supplied to the steam turbine. The cooling of the flue gases introduces a temperature gradient in the flue gases flowing in the conduit; and the hot exhaust gases are introduced into the conduit at a location where the temperature of the flue gases is approximately the same as the temperature of the hot exhaust gases.

Retrofit equipment according to the present invention may also include a secondary blower for pressurizing ambient air, and a solar collector that heats pressurized ambient air produced by the last mentioned blower for producing heated ambient air. During solar insolation, a flow control selectively supplies the heated ambient air from the retrofit equipment as secondary air to a combustion chamber adapted to receive primary air and fossil fuel which burns and produces combustion products. During the night, or in cloudy weather, the secondary blower is quiescent. The power plant also includes a primary blower which introduces secondary air into the combustion chamber producing hot flue gases that are received in the upstream end of a conduit. The flue gases flow through the conduit to a downstream end through which the flue gases are vented to the atmosphere. Heat exchanger coils containing water are positioned in the conduit transfer heat in the flue gases and produce steam that is supplied to a steam turbine coupled to a generator. The steam produced by the coils expands in the turbine and drives the generator producing power and expanded steam. A condenser condenses the expanded steam to condensate; and a pump returns the condensate to the coils.

BRIEF DESCRIPTION OF THE DRAWINGS

Embodiments of the present invention are described by way of example, and with reference to the accompanying drawing wherein.

Like reference numerals and designations in the various drawings refer to like elements.

DETAILED DESCRIPTION

Figure 1:
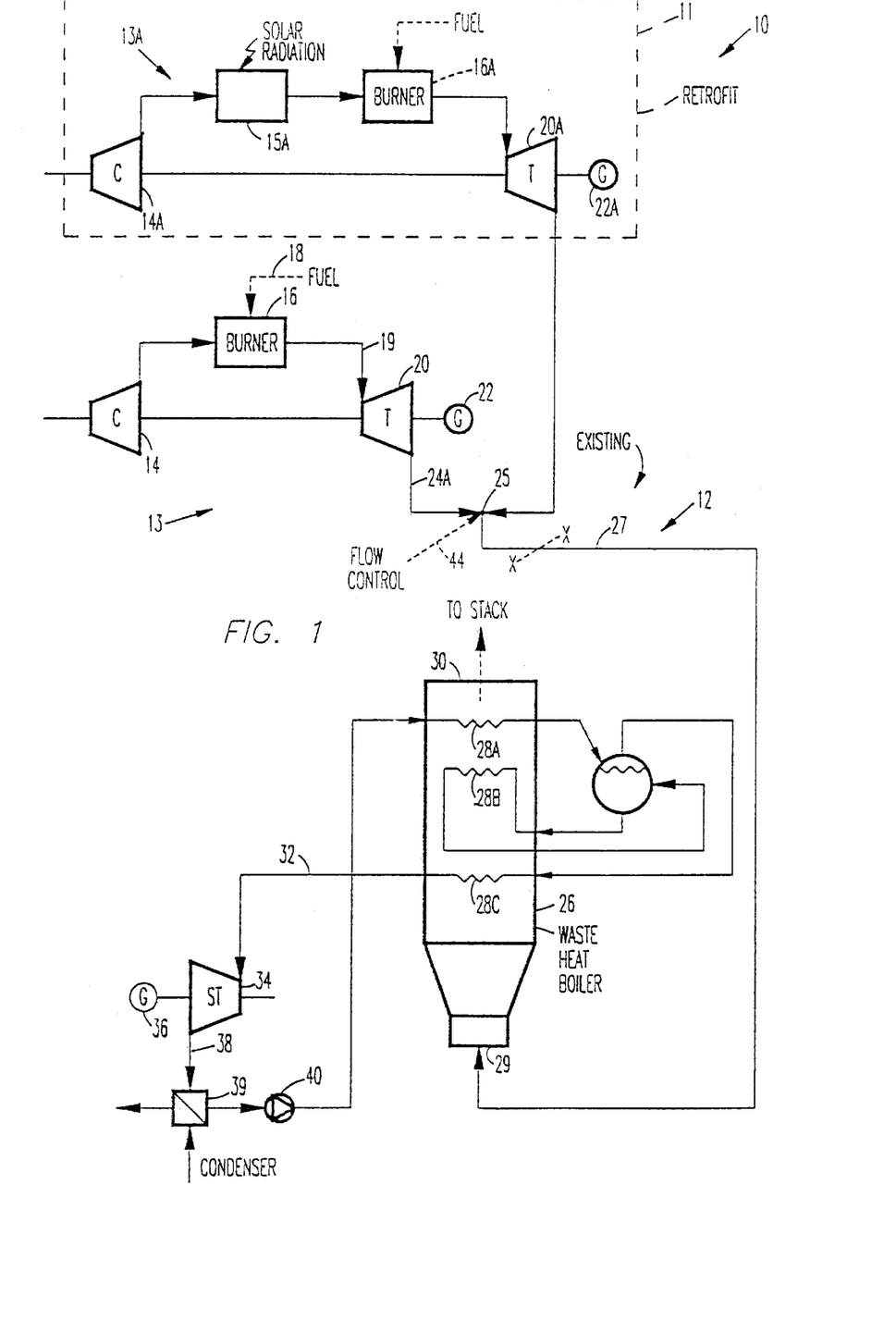
FIG. 1 is a schematic block diagram of one embodiment of the present invention.

Referring now to the drawings, reference numeral 10 designates a first embodiment of apparatus according to the present invention showing retrofit equipment 11 for reducing the consumption of fossil fuel by conventional combined-cycle power plant 12 using solar insolation. Power plant 12 includes primary gas turbine unit 13 including primary compressor 14 for compressing ambient air to produce compressed air that is applied to burner or combustor 16. Fossil fuel in line 18 feeds into burner 16 where combustion takes place heating the compressed air and producing heated compressed air in line 19 that is applied to primary turbine 20 coupled to primary compressor 14 and to primary generator 22. Turbine 20 expands the heated compressed air and drives the primary compressor and the primary generator thereby producing power and hot exhaust gases in line 24.

Power plant 12 also includes waste heat boiler in the form of conduit 26 having a series of heat exchanger coils 28A, 28B, and 28C containing water and receiving the hot exhaust gases in line 27 connected to line 24 at node 25. The hot exhaust gases are applied to the upstream end 29 of boiler 26, and these gases flow through the heat exchanger coils exiting the boiler at upstream end 30. After exiting the boiler, the then heat-depleted exhaust gases are vented to the atmosphere. Treatment of these cooled gases for environmental purposes may take place before venting.

Vaporization of water in the heat exchange coils takes place in a single stage, or multiple stages as shown, producing steam in line 32 which is applied to steam turbine 34 coupled to generator 36. Turbine 34 expands the steam and drives generator 36 producing power from the generator and expanded steam from the turbine exhaust in line 38. Condenser 39 condenses the expanded steam to condensate; and pump 40 returns the condensate to coil 28A in boiler 26 to complete the water loop. After being preheated in coils 28A, the heated water is applied to drum 42 which supplies heated water to vaporizer coils 28B. Steam in drum 42 is applied to superheater coils 28C producing superheated steam that is applied via line 32 to turbine 34. Power plant 12 can operate in a conventional manner on fossil fuel as a combined cycle power plant with power being supplied by generators 22 and 36. In order to reduce the consumption of fossil fuel by the power plant, retrofit equipment 11 is utilized. Being external to plant 12, equipment 11 requires no significant modification to plant 12 except for the provision of flow control 44 which is described below.

Equipment 11 includes auxiliary gas turbine unit 13A including auxiliary compressor 14A for compressing ambient air to produce compressed air, and solar collector 15A that receives the compressed air and heats the same to produce heated compressed air which is applied to auxiliary turbine 20A coupled to auxiliary compressor 14A and to auxiliary generator 22A. Turbine 20A expands the heated compressed air and drives the auxiliary compressor and the auxiliary generator thereby producing power and hot exhaust gases in line 24A. Flow control 44 selectively connects line 27 to either line 24 or to line 24A at node 25. When solar insolation is available, flow control 44 connects line 24A to line 27, and hot exhaust gases from retrofit equipment 11 are supplied to boiler 26. During cloudy days or inclement weather, or during the night, flow control 44 connects line 24 to line 27, and hot exhaust gases from gas turbine unit 13 are are supplied to boiler 26.

To provide short-term backup for the operation of retrofit equipment 11 during intermittently cloudy weather, etc., auxiliary burner 16A may be interposed between solar collector 15A and turbine 20A. Burner 16A is supplied with fossil fuel and operated only as needed during operation of unit 13A. However, in certain cases,when needed, or necessary, or when the equipment makes it possible, both primary gas turbine unit 13 and auxiliary gas turbine unit 13A can be used simultaneously.

Figure 2:
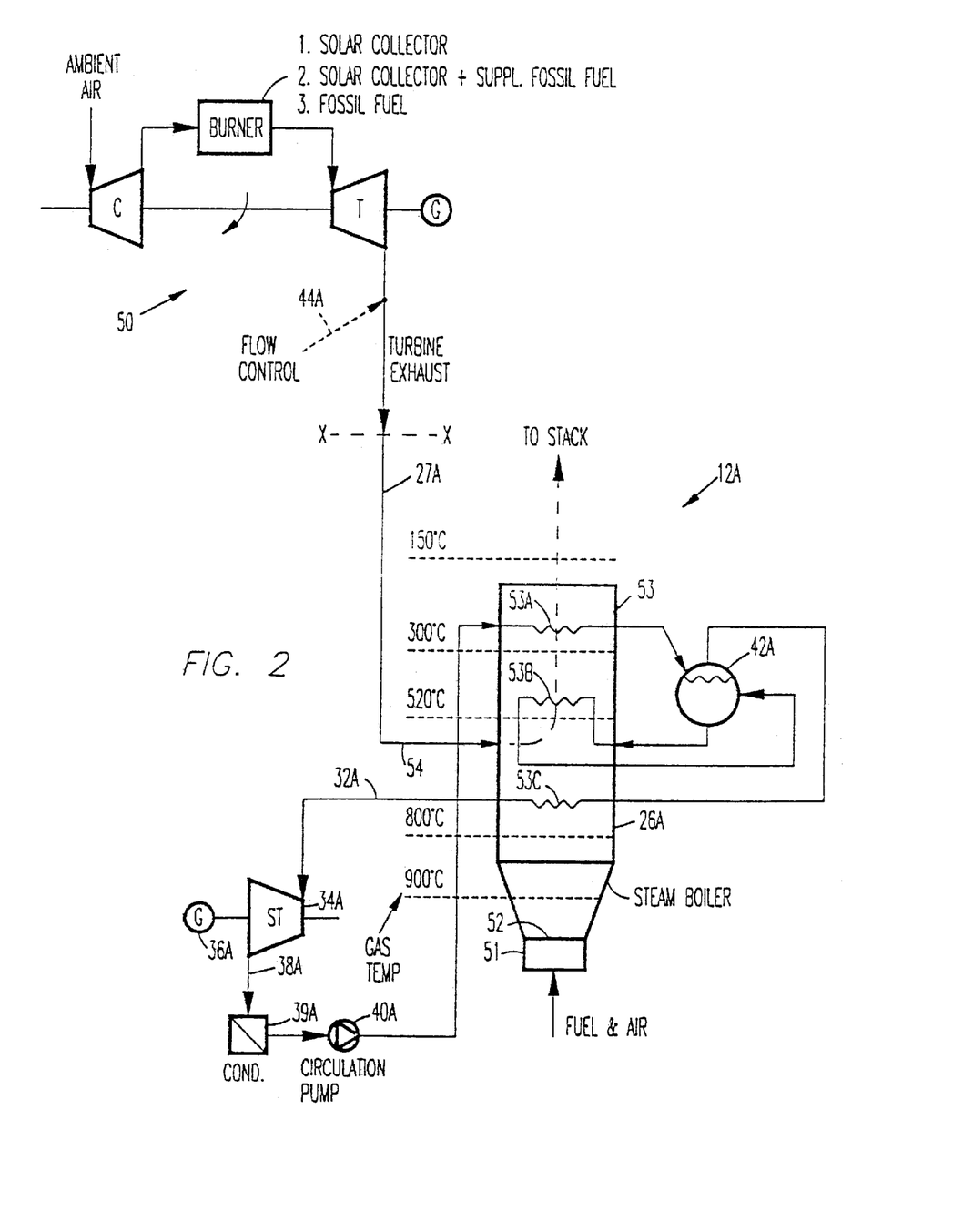
FIG. 2 is a schematic block diagram showing a modification of the steam generating apparatus shown in FIG. 1.

Power plant 12A in FIG. 2, which uses a fossil-fueled steam boiler, can be used in place of power plant 12 in FIG. 1, which uses a waste heat boiler. Reference numeral 50 in FIG. 2 designates gas turbine units like that shown in FIG. 1 but shows these units schematically upstream of the designator X—X in exhaust line 27A. That is to say, the apparatus in FIG. 2 downstream of designator X—X can be substituted for the apparatus in FIG. 1 downstream of the designator X—X in FIG. 1.

Power plant 12A in FIG. 2 includes a fossil-fueled boiler in the form of conduit 26A having a series of heat exchanger coils 53A, 53B, and 53C containing water and receiving both the hot exhaust gases in line 27A, which corresponds to line 27 in FIG. 1, and hot flue gases produced by the burning of fossil fuel in combustion chamber 51. The hot flue gases enter conduit 26A at its upstream end 52 and flow successively through the heat exchanger coils in conduit 26A to downstream end 53 through which heat-depleted flue gases pass before being vented to the atmosphere. After exiting the boiler, the then heat-depleted gases are vented to the atmosphere. Treatment of these cooled gases for environmental purposes may take place before venting.

Vaporization of water in the heat exchange coils takes place in a single stage, or multiple stages as shown, producing steam in line 32A which is applied to steam turbine 34A coupled to generator 36A. Turbine 34A expands the steam and drives generator 36A producing power from the generator and expanded steam from the turbine exhaust in line 38A. Condenser 39A condenses the expanded steam to condensate; and pump 40A returns the condensate to coil 53A in the boiler to complete the water loop. After being preheated in coils 53A, the heated water is applied to drum 42A which supplies heated water to vaporizer coils 53B. Steam in drum 42A is applied to superheater coils 53C producing superheated steam that is applied via line 32A to turbine 34A.

Heat extracted from the hot flue gases interacting with the heat exchanger coils in conduit 26A introduce a temperature gradient in the flue gases flowing in the conduit. This gradient is suggested by the broken lines indicated flue gas temperature at various axially displaced places along the flow path of the gases in the conduit.

Means 54 introduce the hot exhaust gases in line 27A into conduit 26A at an axial location where the temperature of the flue gases is approximately the same as the temperature of the hot exhaust gases. Thus, beyond the point at which the exhaust gases from the turbines are introduced into conduit 26A, both the exhaust gases and the flue gases contribute to the heating of water in the heat exchanger coils. However, when using a duct burner below designation X—X in line 27A, for example, the hot gases produced can be added to the entrance of boiler 26A near upstream end 52.

Flow control 44A selectively connects line 27A to the exhaust line of either the solar turbine of the fossil-fueled turbine that are contained in apparatus 50 depending on the solar insolation situation. When solar insolation is available, flow control 44A connects hot exhaust gases from the solar powered gas turbine unit in the retrofit equipment to boiler 26A. During cloudy days or inclement weather, or during the night, flow control 44A connects hot exhaust gases from the fossil-fueled gas turbine unit to boiler 26A. Also, if a burner is included in the solar powered gas turbine unit (as shown in FIG. 1), the burner can be used during short periods of cloudy weather, etc.

Figure 3:
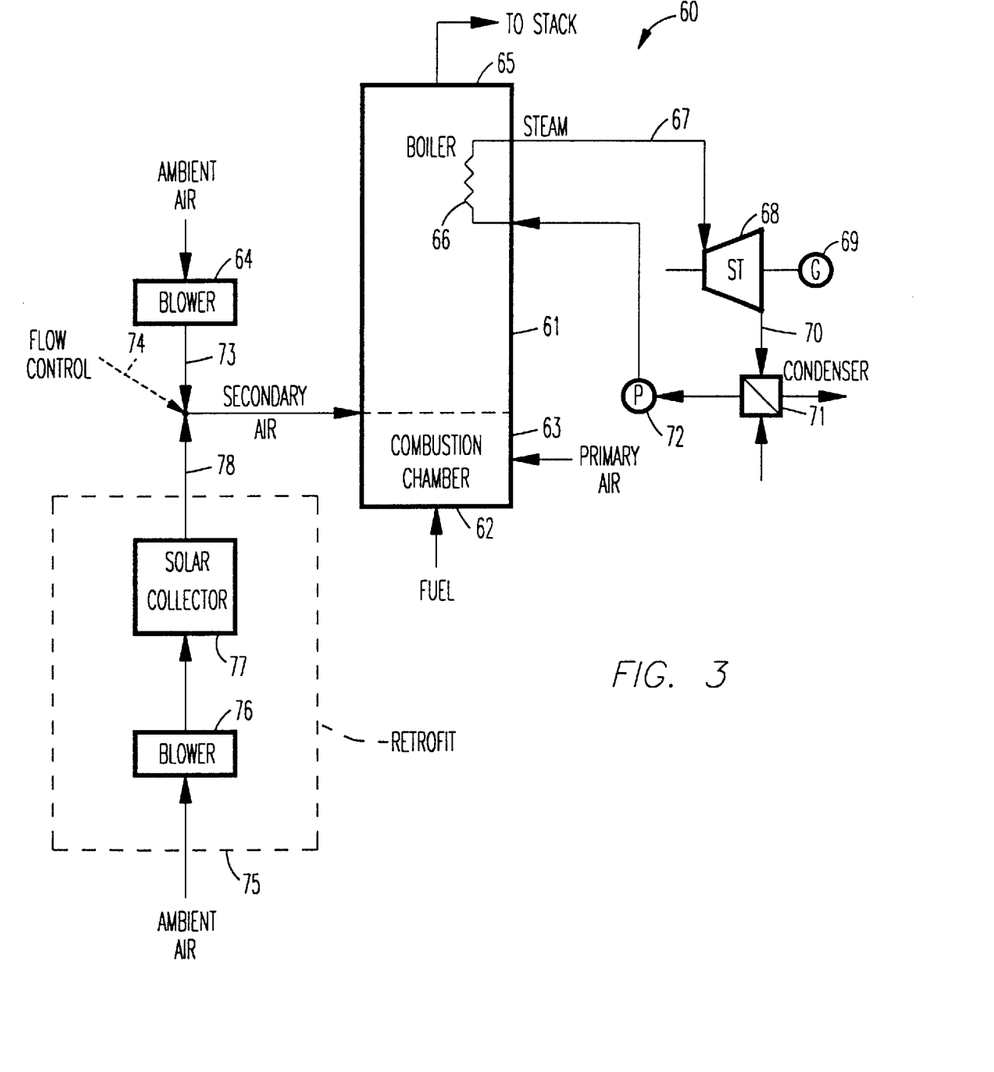
FIG. 3 is a schematic block diagram of a further embodiment of the present invention.

A further embodiment of retrofit equipment for reducing the consumption of fossil fuel by a power plant during solar insolation is shown in FIG. 3 to which reference is now made. Power plant 60 includes a boiler having conduit 61 at whose upstream end 62 is combustion chamber 63 adapted to receive fossil fuel and primary air for burning the fuel and producing combustion products. Primary blower 64 supplies pressurized ambient air to line 73 through which secondary air can be introduced into the combustion chamber by flow control 74 of retrofit equipment 75. Hot flue gases produced in the combustion chamber pass in heat exchange contact with coils 66 in the boiler before flowing into upstream end 65 of the boiler. Heat depleted flue gases exit upstream end 65 and are vented to the atmosphere.

Heat exchanger coils 66 contain water and are positioned in the conduit so as to transfer heat in the flue gases to the water producing steam in line 67. Steam turbine 68 coupled to generator 69 expands the steam in line 67 and drives the generator producing power and expanded steam in line 70. Condenser 71 condenses the expanded steam into condensate which is returned by pump 72 to coils 66.

In addition to flow control 74, retrofit equipment 75 also includes secondary blower 76 which pressurizes ambient air that is supplied to solar collector 77. During solar insolation, the pressurized ambient air supplied by blower 76 is heated in collector 77 and supplied to line 78. Flow control 74 serves as means for selectively connecting either line 73 or line 78 to the combustion chamber whereby heated ambient air from retrofit equipment 75 can be supplied to the combustion chamber when solar insolation is available thereby reducing the consumption of fossil fuel. In either case, for environmental reasons, treatment of the cooled gases exiting upstream end 65 may take place before atmospheric venting.

Figure 4:
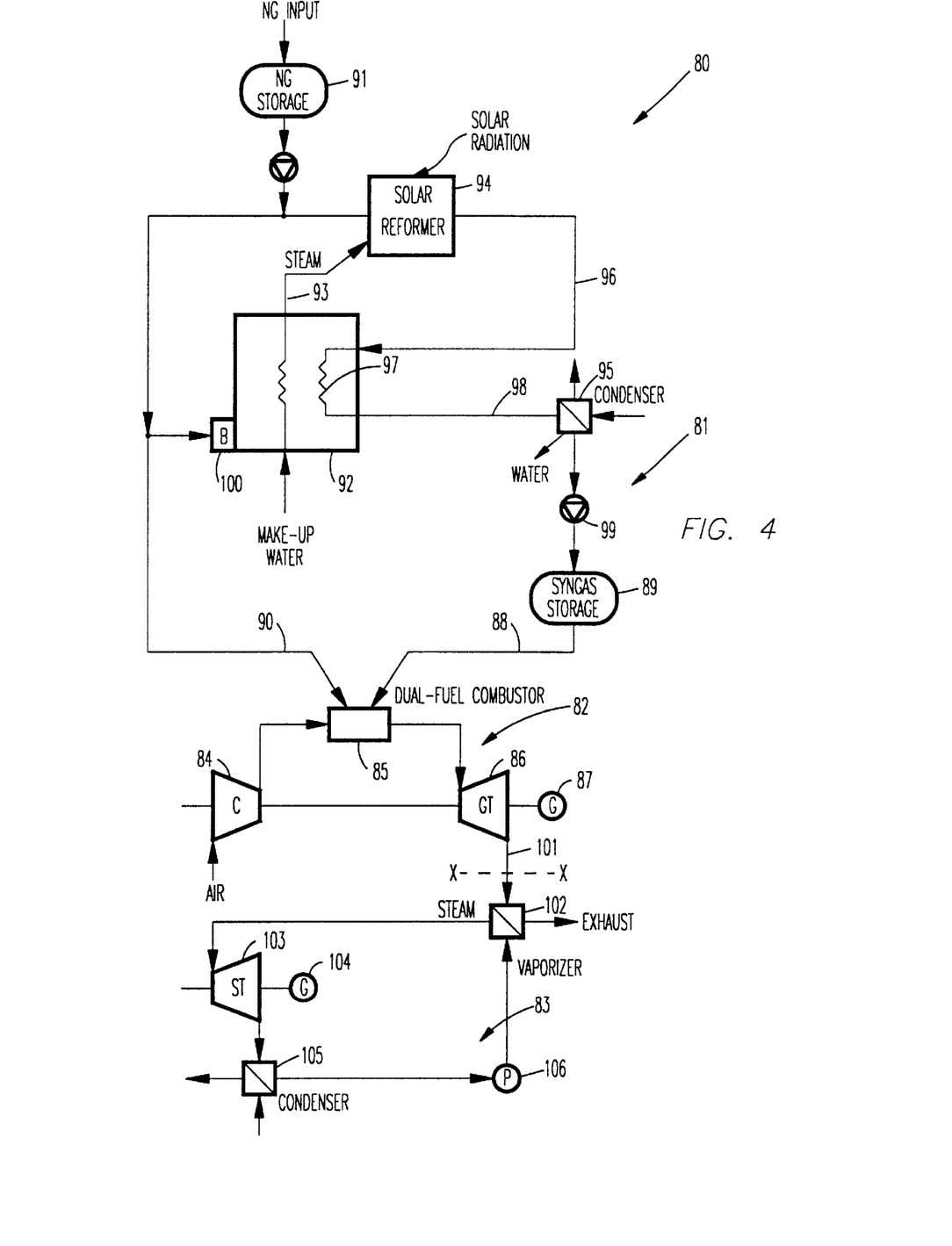
FIG. 4 is a schematic block diagram of still another embodiment of the present invention.

The present invention also includes power plant 80 for generating power using synthetic gas as shown in FIG. 4. Power plant 80 includes solar reformer apparatus 81, gas turbine unit 82, and steam turbine unit 83. Reformer apparatus 81 is equipment constructed and arranged to reform a hydrocarbon gas from a source into synthetic gas. Reforming actually refers to the use of heat for driving an endothermic chemical reaction between a hydrocarbon feedstock and steam or $CO_2$ in the presence of a catalyst. The result or products of such reaction is a mixture of hydrogen and carbon monoxide, and often, residual amounts of the feedstock. Such mixture is commonly referred to as synthetic gas or syngas. The feedstock to a reformer can be a gas such as natural gas, LNG, LPG, biogas produced from anaerobic digestion, landfill gas, gas produced from a fermentation process, gas produced from a pyrolysis system, gas produced from a gasification system, etc. The feedstock to the reformer, as well as to such gas producing systems, can also be a solid or liquid carbonaceous material such as coal, biomass, oil shale, oil residue, petcoke, asphaltenes, etc. The reformed hydrogen enriched syngas has about 30% higher heat energy than the original feedstock.

Gas turbine unit 82 includes compressor 84 for compressing air to produce compressed air, heater 85 for heating the compressed air to produce heated compressed air, and turbine 86 coupled to generator 87 and to the compressor for expanding the heated compressed air and producing power and hot exhaust gases in line 101. Heater 85 is designed to burn natural gas (NG) and syngas; and line 88 supplying syngas from storage tank 89, and line 90 supplying NG from storage tank 91 constitute means for supplying both syngas produced by apparatus 81 and NG from tank 91 to heater 85. Preferably, apparatus 81 utilizes solar radiation as a heat source in reforming NG into syngas. Reformer apparatus 81 includes boiler 92 for burning NG from storage 91 and producing steam in line 93, solar reformer 94 containing a catalyst and and condenser 95. Reformer 94 receives NG from storage tank 91, and is responsive to solar radiation and to steam from the boiler for reforming the NG into a precursor of syngas that exits the reformer in line 96.

Heat exchanger 97 associated with boiler 92 adds heat to boiler 92 and permits the reduction, or termination of the heat supplied by the burner 100. Water vapor in the syngas is extracted in condenser 95 and the dried syngas is supplied to pump 99 which delivers the syngas to storage tank 89. During periods of solar insolation, apparatus 81 converts NG from a source to syngas which is stored in tank 89. Depending upon the flow rate of NG into storage tank 91, the sizes of storage tanks 89 and 91, the fuel consumption of turbine 86, and the amount of solar insolation, operation of gas turbine unit 82 may be sustained by supplying only syngas to heater 85. However, for practical reasons, it is preferred to provide NG backup for operation of the power plant. Thus, NG is supplied to burner 100 that fires boiler 92 of apparatus 81 as well as to line 90 that supplied NG to heater 85.

As shown in FIG. 4, apparatus 81 includes vaporizer 102 containing water and responsive to hot exhaust gases in line 101 for producing steam, and steam turbine 103 coupled to generator 104 for expanding steam produced by the vaporizer and producing power and expanded steam. The expanded steam is condensed in condenser 105 to condensate which pump 106 returns to the vaporizer.

Vaporizer 102 in FIG. 4 may take various forms; and designator X—X in FIG. 4 denotes a symbolic separator that indicates a connection to any one of several devices operating on exhaust gases from a turbine. For example, a waste heat boiler like that shown in FIG. 1 below the designator X—X could be used, or a steam boiler like that shown in FIG. 2 below the designator X—X could be used.

In a further embodiment, a power plant can be retrofitted as shown in FIG. 1 with the fuel for the burner being supplied from a syngas storage. In this embodiment, the syngas can be produced using one of the many methods for producing syngas from carbonaceous material, e.g., the syngas can be produced using a solar reformer of the type disclosed with reference to FIG. 4 with the syngas being supplied from syngas storage 89 shown in FIG. 4.

In the embodiments of the present invention, rather than using the steam produced to operate a steam turbine, the steam or portion thereof can be used for process heating or in other cogeneration processes.

In addition, although the above description describes the present invention in terms of retrofit equipment, the present invention as disclosed in the above described embodiments can be used for producing power in new power plants as well.

While the above description uses the term retrofit, it should be understood that this term is used herein to include the addition of solar energy systems of the type disclosed above to existing systems. In addition, such term is used herein to include the actual improvement of power plant components such a boiler, a combustion chamber associated with a boiler, etc.

In situations where gas pipelines pass through a region where solar insolation is relatively high, the present invention can be used for solar reforming some or all of the gas to syngas. The thus produced syngas can be added to the gas flowing in the pipeline, and/or can be directed to a gas turbine unit, or a combined cycle power plant associated with the solar reformer for producing electricity.

Figure 5:
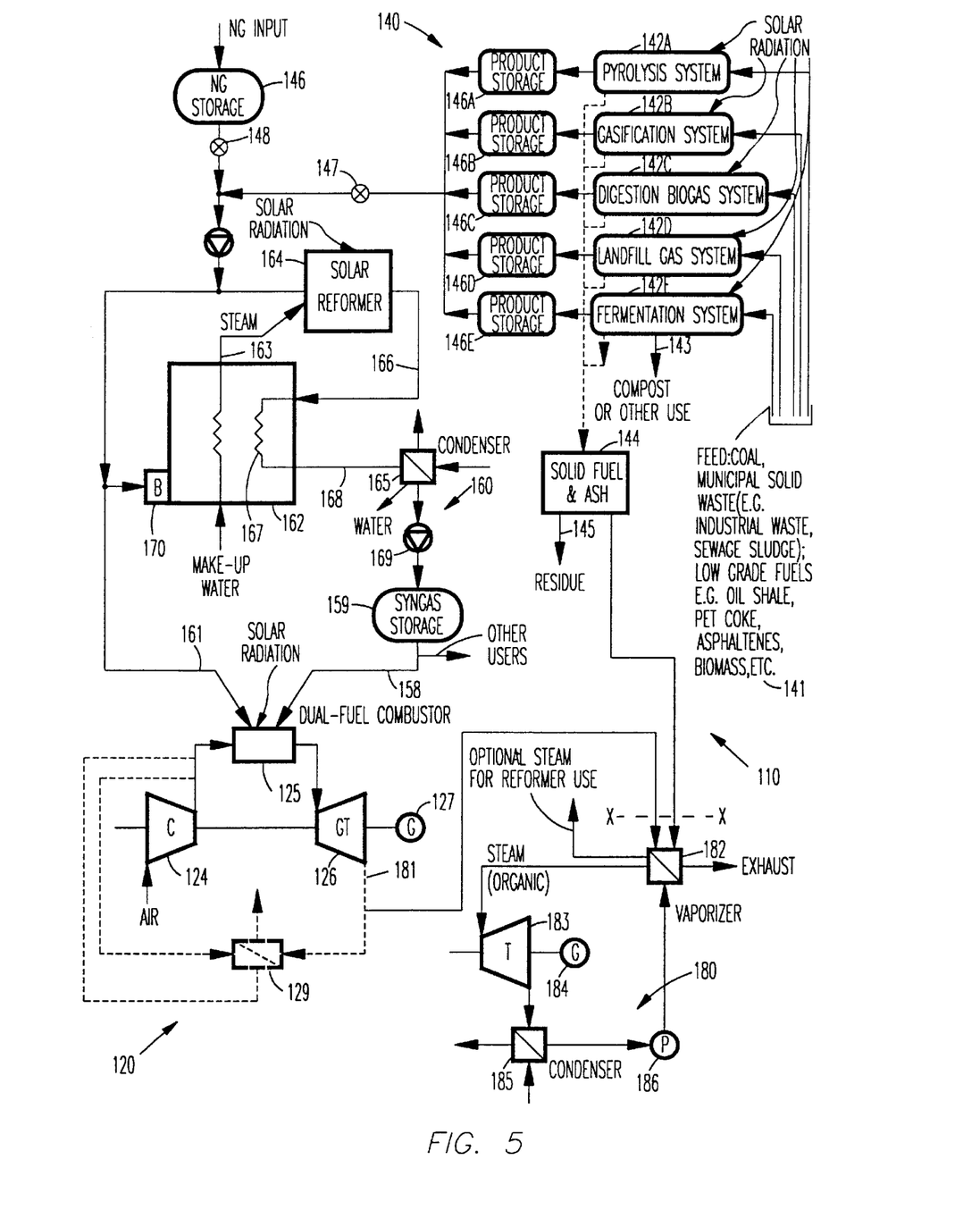
FIG. 5 is a schematic block diagram of a further embodiment of the present invention.

Referring now to FIG. 5, reference numeral 110 designates one embodiment of a power plant according to the present invention for generating power using synthetic gas. Plant 110 includes gas turbine unit 120, fuel producer apparatus 140, reformer apparatus 160, and bottoming turbine unit 180. Reformer apparatus 160 has equipment constructed and arranged to reform a hydrocarbon gas or material from a source into synthetic gas. Reforming actually refers to the use of heat for driving an endothermic chemical reaction between a hydrocarbon feedstock and steam or $CO_2$ in the presence of a catalyst. The result or products of such reaction is a mixture of hydrogen and carbon monoxide, and often, residual amounts of the feedstock. Such mixture is commonly referred to as synthetic gas or syngas.

The feedstock to a reformer can be a gas such as natural gas, LNG, LPG, hydrocarbon gas or biogas. The biogas can be produced from anaerobic digestion, landfill gas, gas produced by a fermentation system using a fermentation process, gas produced from a pyrolysis system, gas produced from a gasification system, etc. as shown in FIG. 5. Feed 141 for such a fuel producer apparatus, designated as numeral 140, can also be a solid or liquid carbonaceous material such as coal, and/or municipal solid waste (e. g. industrial waste, sewage sludge, etc.), biomass, other low grade fuels e. g. oil shale, oil residue, petcoke, asphaltenes, etc. and mixtures thereof. The reformed hydrogen enriched syngas has about 25% higher heat energy than the feedstock.

In this embodiment of the present invention, feed 141 is supplied to one of several devices, designated 142A–142E, for producing a product, a hydrocarbon gas or material or biogas, which can be stored as feedstock in product storage, designated 146A–146E, for later supply to the reformer. All of these devices use solar radiation as at least one of their heat inputs or sources. Thus, e. g. gasification system 142B utilizes solar radiation as one of its heat sources. The gasified product or biogas, produced by the fuel producer apparatus by use of solar radiation can be stored as feedstock in product storage 146B and supplied to solar reformer 164. Similarly, the other systems, designated 142A–142E, shown in the figure operate in a manner analogous to the gasification system described above. If insufficient solar radiation is available or one such system is not operable, valve 147 is closed and reformer 164 receives natural gas (NG) from NG storage 146 via valve 148.

Gas turbine unit 120 includes compressor 124 for compressing air to produce compressed air and combustor 125 for heating the compressed air to produce heated compressed air. Turbine 126, included in gas turbine unit 120, is coupled preferably to generator 127 and to the compressor for expanding the heated compressed air and producing power and hot exhaust gases in line 181. Combustor 125 is designed to burn natural gas (NG), biogas or syngas. Line 158 supplying syngas from storage tank 159, and line 161 supplying NG from storage tank 146 or biogas from apparatus 140 constitute supply means for supplying syngas produced by apparatus 160, biogas produced by apparatus 140 and NG from tank 146 to combustor 125. Furthermore, preferably, solar radiation via a solar receiver can be used as shown e. g. to heat the compressed air from compressor 124. In such a case, the fuel, e.g. the syngas, natural gas (NG) or hydrocarbon gas, material or biogas can be used as supplementary heating to bring the temperature of the heated air to the required level if necessary. Preferably, apparatus 160 utilizes solar radiation as a heat source in reforming NG or other gas supplied from fuel producer apparatus 140 into syngas. Reformer apparatus 160 includes boiler 162 for producing steam in line 163, solar reformer 164 containing a catalyst and condenser 165. Reformer 164 receives NG from storage tank 146 or other gas from product storage 146A–146E, and is responsive to solar radiation and to steam from the boiler for reforming the NG or other gas into a precursor of syngas that exists the reformer in line 166. Operation using NG will normally take place during start-up or during supplementary firing when, e. g. there is insufficient solar radiation such as during cloudy periods. Since solar radiation is used in the reformer, relatively high temperatures are achieved in the solar reformer. Thus, the amount of contaminants present in the syngas produced from the hydrocarbon material or from the natural gas, even if such contaminants were present in the hydrocarbon material or natural gas, will be minimal.

Heat exchanger 167 associated with boiler 162 adds heat to the boiler and permits the reduction, or termination of the heat supplied by the burner 170. Water vapor in the syngas is extracted in condenser 165 and the dried syngas is supplied to pump 69 which delivers the syngas to storage tank 159.

During periods of solar radiation, apparatus 160 converts NG or gas produced from source 141 to syngas which is stored in tank 159. Depending upon the flow rate of NG into storage tank 146, the sizes the storage 159 and 146, the fuel consumption of turbine 126, and the amount of solar radiation, operation of gas turbine unit 120 may be sustained by supplying only syngas to combustor 125. However, for practical reasons, it is preferred to provide NG backup for operation of the power plant. Thus, NG is supplied to burner 170 that fires boiler 162 of apparatus 160 as well as to line 161 that supplied NG to combustor 125.

As shown in FIG. 5, power plant 110 includes vaporizer 182 preferably containing water and responsive to hot exhaust gases in line 181 for producing steam, and steam turbine 183 coupled to generator 184 for expanding steam produced by the vaporizer and producing power and expanded steam. The expanded steam is condensed in condenser 185 to condensate which pump 186 returns to the vaporizer.

Vaporizer 182 in FIG. 5 may take various forms and designator X—X in FIG. 5 denotes a symbolic separator that indicates a connection to any one of several devices operating on exhaust gases from a turbine. For example, a waste heat boiler like that shown in FIG. 5 below the designator X—X could be used, or a steam boiler could be used. Solid fuel or ash 144 can be used or combusted in such waste heat boiler systems. Alternatively, in a further embodiment of the present invention, rather than using the steam produced to operate a steam turbines the steam or portion thereof can be used for process heating or in other cogeneration processes. Furthermore, portion of the steam produced can be used as optional steam for reformer 164.

Furthermore, as shown in FIG. 5 rather than using water as the working fluid in the power bottoming cycle cycle 180, an organic working fluid, such as pentane, iso-pentane, etc., can be used in this power, bottoming cycle for producing power by expanding organic vapor in the turbine.

In addition, rather than providing a bottoming power cycle, the hot exhaust gases can be used for recuperating heat or heating, in heat exchanger 129, compressed air exiting compressor 124 of gas turbine unit 112 prior to supplying the compressed air to combustor 125.

Additionally, the produced syngas (i.e. hydrogen enriched gas) can be used for other purposes as shown in FIG. 5 such as for fueling fuel cells or as fuel for land, sea or air vehicles, etc.

In a further alternative, fuel producer apparatus 140 can operate or produce a product, a hydrocarbon gas, material or biogas, in accordance with the present invention, with heat sources other than solar radiation as one of its heat inputs or sources.

Moreover, it should be noted that supply means or lines mentioned in this specification refers to suitable conduits, etc. In situations where gas pipelines pass through a region where solar radiation is relatively high, the present invention can be used for solar reforming some or all of the gas to syngas. The thus produced syngas can be added to the gas flowing in the pipeline, and/or can be directed to a gas turbine unit, or a combined cycle power plant associated with the solar reformer for producing electricity.

Figure 6:
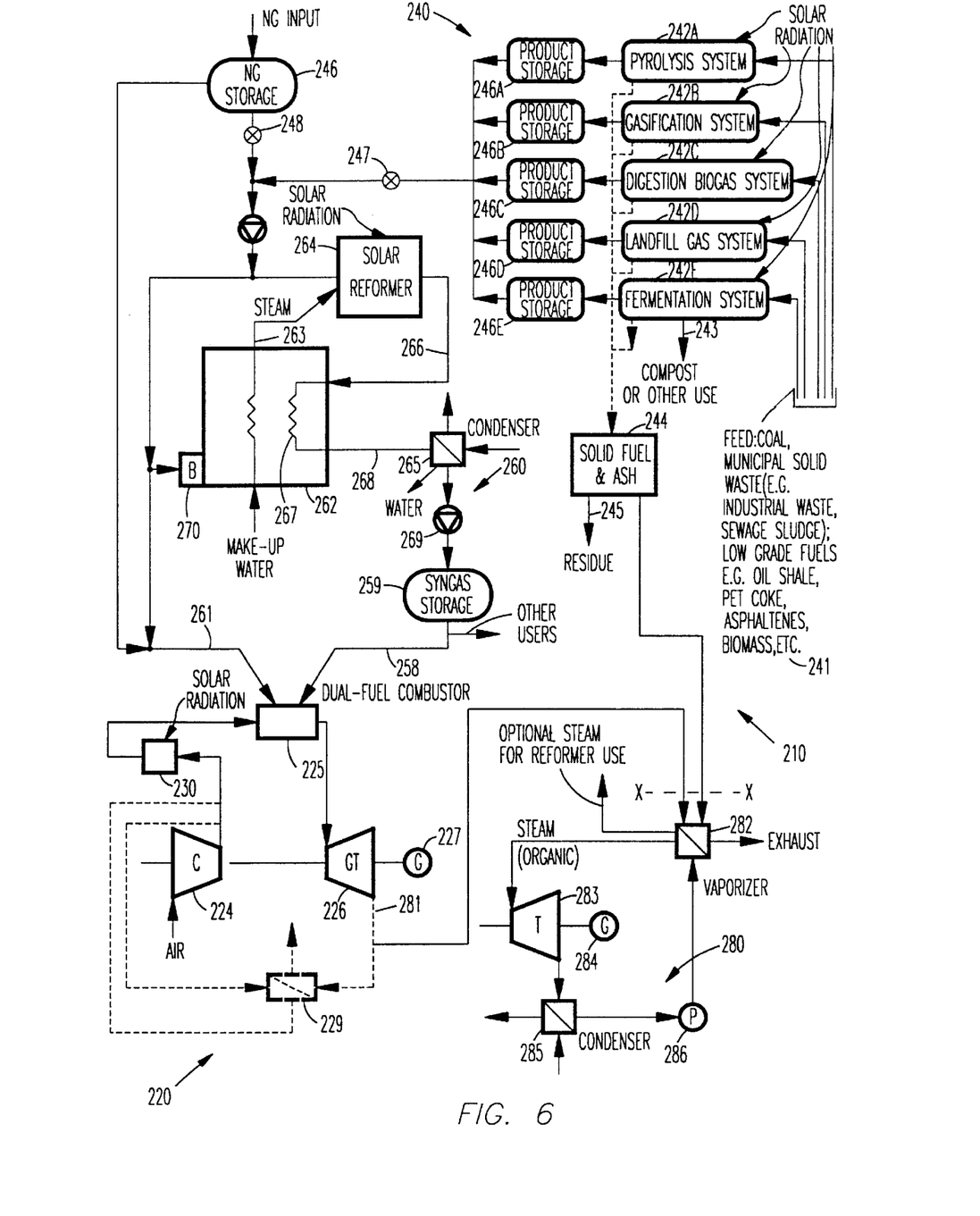
FIG. 6 is a schematic block diagram of a still further embodiment of the present invention.

While the use of landfill gas (LFG) or other hydrocarbon or biogas feedstock gas previously mentioned for producing reformer gas and operating the burner of the gas turbine has been mentioned above, in a further embodiment of the present invention, landfill gas or other hydrocarbon or biogas feedstock gas previously mentioned is supplied to the reformer while natural gas (as well as syngas) is supplied to the burner of the gas turbine (see FIG. 6). While a dual burner is shown, separate burners can be provided if preferred.

Thus, in this embodiment, natural gas (NG) is used as the fuel for combustor 225 of the gas turbine unit. In addition, however, the natural gas can serve as a back up for the reformer as well, and in some cases, as the back up of burner 225 when, e.g., not enough product is available in product storage 246A–246E of fuel producer apparatus 240. Furthermore, if preferred, in specific sites, solar radiation, such as residual solar radiation, can be used in solar radiation heater 230 for heating or preheating compressed air from compressor 224 of gas turbine unit 220. In addition, fuel producer apparatus 240 can operate or produce a product, a hydrogen gas, material or biogas, without solar radiation and using other heat sources if necessary or preferred.

Furthermore, while the burner or burners supplied with syngas and/or NG are shown as producing combustion gases for operating a gas turbine as previously described, in a further embodiment, the combustion gases merely provide heat to water for producing steam. Preferably, the steam is used for operating a steam turbine for producing power or electricity (see FIG. 7).

Figure 7:
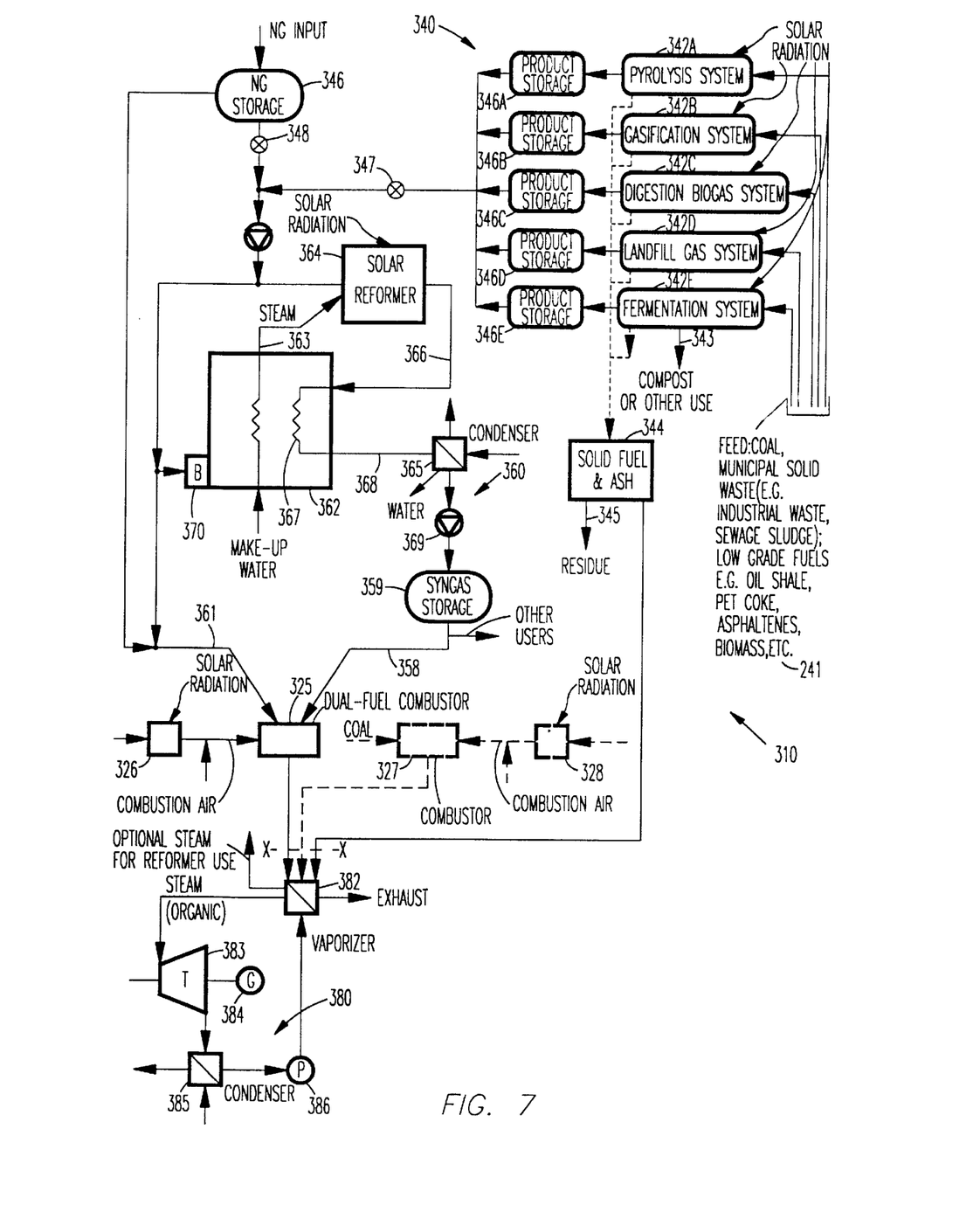
FIG. 7 is a schematic block diagram of an even further embodiment of the present invention.

If preferred, an organic working fluid, most preferably n-pentane or isopentane, can be used. Also here, if preferred, in specific sites, solar radiation, such as residual solar radiation, etc., can be used in solar radiation heater 326 for heating or preheating combustion air.

In a further alternative, coal can be supplied to the burner as well. If preferred, separate burners can be used. Similarly, if preferred, in specific sites, solar radiation, such as residual solar radiation, etc., can be used for heating or preheating combustion air supplied to coal burner 327 used in solar radiation heater 328.

Furthermore, if preferred, portion or all of solid fuel and ash shown in FIG. 5–7 can be combusted in the combustor of the gas turbine unit or in the coal combustor.

In addition, if preferred, condenser 95 in FIG. 4, condenser 165 in FIG. 5, condenser 265 in FIG. 6 and condenser 365 in FIG. 7 of the reformer apparatus can be cooled by water or organic fluid. The heated water or heated organic fluid produced thereby can be used in steam power cycle 83 in FIG. 4, bottoming power cycle 180 in FIG. 5, bottoming cycle 280 in FIG. 6 and bottoming cycle 380 in FIG. 7. The preferred organic fluid is n-pentane or iso-pentane. In these power cycles, these condensers can be preheaters or vaporizers. Under certain situations, the heat extracted from these condensers may be the only heat source for these power cycles.

It is believed that the advantages and improved results furnished by the method and apparatus of the present in are apparent from the foregoing description of the invention. Various changes and modifications may be made without departing from the spirit and scope of the invention as described in the claims that follow.

What is claimed is:

1. Apparatus for generating power comprising:
    a) equipment constructed and arranged to reform a hydrocarbon gas from a source into a synthetic gas;
    b) a gas turbine unit including a compressor for compressing air to produce compressed air, a heater for heating said compressed air to heated gas, and a turbine coupled to a generator and to said compressor for expanding said heated gas and producing power and from which hot expanded gases are extracted; and
    c) means for supplying natural gas to said heater.

2. Apparatus according to claim 1 wherein said equipment utilizes solar radiation as a heat source in reforming said hydrocarbon gas into synthetic gas.

3. Apparatus according to claim 1 further including a solar heater for heating said compressed air prior to supplying said compressed air to said heater.

4. Apparatus according to claim 1 further including a vaporizer containing water and responsive to said hot exhaust gases for producing steam.

5. Apparatus according to claim 4 further including:
    a) a steam turbine for expanding steam produced by said vaporizer and producing power and from which expanded steam is extracted;
    b) a condenser for condensing said expanded steam to condensate; and
    c) a pump for returning said condensate to said vaporizer.

6. Apparatus according to claim 1 wherein said hydrocarbon gas is landfill gas.

7. Apparatus according to claim 1 wherein said synthetic gas is also supplied to said heater.

8. Apparatus for generating power comprising:
    a) equipment constructed and arranged to reform a hydrocarbon gas from a source into synthetic gas, said equipment having a boiler for burning said hydrocarbon gas and producing steam, a reformer receiving said hydrocarbon gas and steam and reforming said hydrocarbon gas into a precursor of said synthetic gas, a heat exchanger associated with said boiler for heating said precursor and producing said synthetic gas containing water vapor and a condenser for extracting water vapor from said synthetic gas;
    b) a heater for burning fuel and producing hot combustion gases;
    c) a vaporizer containing working fluid and responsive to heat extracted fro said hot combustion gases and producing vaporized working fluid;
    d) a turbine for expanding said working fluid produced by said vaporizer and producing power and from which expanded working fluid is extracted;
    e) a working fluid condenser for condensing said expanded working fluid to condensate; and
    f) a pump for returning said condensate to said vaporizer.

9. Apparatus according to claim 8 wherein said working fluid is water.

10. Apparatus according to claim 8 wherein said fuel is natural gas.

11. Apparatus according to claim 8 wherein said fuel is coal.

12. Apparatus according to claim 10 wherein synthetic gas is also supplied to said heater.

13. Apparatus for generating power comprising:
   a) equipment constructed and arranged to reform a hydrocarbon gas from a source into synthetic gas, said equipment having a boiler for burning said hydrocarbon gas and producing steam, a reformer receiving said hydrocarbon gas and steam and reforming said hydrocarbon gas into a precursor of said synthetic gas, a heat exchanger associated with said boiler for heating said precursor, and producing said synthetic gas containing water vapor, and a condenser for extracting water vapor from said synthetic gas;
   b) a heat exchanger system containing working fluid and responsive to heat extracted from said condenser for producing vaporized working fluid;
   c) a turbine for expanding said working fluid produced by said vaporizer and, producing power and from which expanded working fluid is extracted;
   d) a working fluid condenser for condensing said expanded working fluid to condensate; and
   e) a pump for returning said condensate to said vaporizer.

14. Apparatus according to claim 13 wherein said equipment utilizes solar radiation as a heat source in reforming said hydrocarbon gas into synthetic gas.

15. Apparatus according to claim 13 wherein said heat exchanger system includes a vaporizer responsive to heat extracted from said condenser for producing vaporized working fluid.

16. Apparatus according to claim 13 wherein said working fluid is organic working fluid.

17. Apparatus according to claim 16 wherein said organic working fluid is pentane.

18. Apparatus according to claim 13 further including a heater for burning natural gas supplied to said heater and producing combustion gases.

19. Apparatus according to claim 18 wherein said heat exchanger system includes a vaporizer responsive to heat contained in said combustion gases for producing vaporized working fluid.

20. Apparatus according to claim 19 wherein said heat exchanger system further includes a preheater responsive to heat extracted from said condenser for producing preheated working fluid which is supplied to said vaporizer.

21. Apparatus according to claim 8, wherein said equipment utilizes solar radiation as a heat source in reforming said hydrocarbon gas into a synthetic gas.

22. Apparatus accordidng to claim 8 further comprising a solar heater for adding heat to said heater.

23. Appartus according to claim 13 further comprising a solar heat for adding heat to said heat exchanger system.

24. Apparatus accordidng to claim 13 wherein said working fluid is water.

* * * * *

UNITED STATES PATENT AND TRADEMARK OFFICE
CERTIFICATE OF CORRECTION

PATENT NO.   : 6,321,539 B1
DATED        : November 27, 2001
INVENTOR(S)  : Lucien Y. Bronicki and Uriyel Fisher Page 1 of 1

It is certified that error appears in the above-identified patent and that said Letters Patent is hereby corrected as shown below:

Title page,
Item [63], please insert as follows:
-- This application is a continuation-in-part of U. S. Application Serial No. 09/150,665, filed September 10, 1998, now U.S. Patent No. 6,237,337, issued on May 29, 2001 and a continuation-in-part of U. S. Application No. 09/336,585, filed on June 21, 1999. --

Signed and Sealed this

Third Day of December, 2002

JAMES E. ROGAN
*Director of the United States Patent and Trademark Office*